July 7, 1959
L. BOUMA
2,893,350
COUNTERWEIGHTED MILKING MACHINE RECEPTACLE SUPPORT
Filed Feb. 27, 1958
2 Sheets-Sheet 1
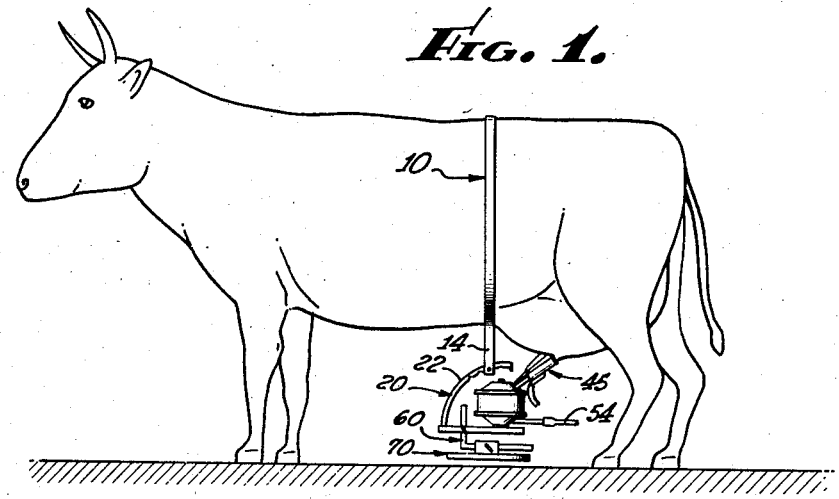
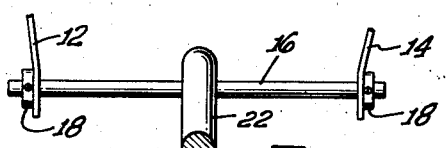
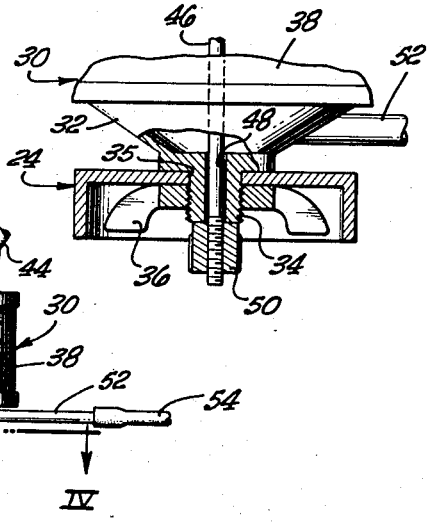
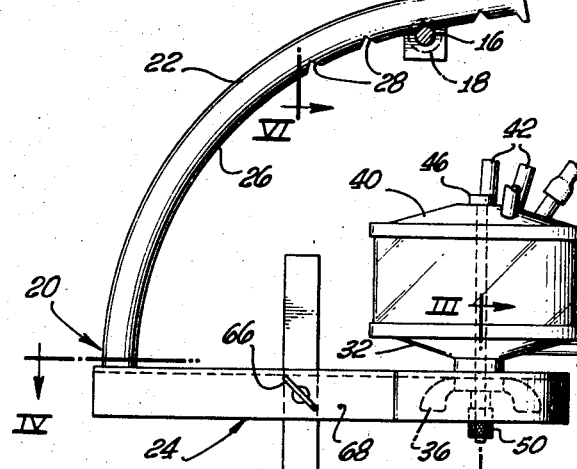
LAWRENCE BOUMA
INVENTOR.
BY
ATTORNEYS.

July 7, 1959

L. BOUMA 2,893,350

COUNTERWEIGHTED MILKING MACHINE RECEPTACLE SUPPORT

Filed Feb. 27, 1958

LAWRENCE BOUMA
INVENTOR.

BY

ATTORNEYS.

United States Patent Office 2,893,350
Patented July 7, 1959

2,893,350

COUNTERWEIGHTED MILKING MACHINE
RECEPTACLE SUPPORT

Lawrence Bouma, Ontario, Calif.

Application February 27, 1958, Serial No. 717,860

7 Claims. (Cl. 119—14.12)

The present invention relates generally to improvements in milking machinery and more specifically describes an improved construction for selectively stabilizing movement of the milk receptacle conventionally used for suctionally receiving milk through flexible conduits extending from conventional teat cups to the receptacle.

In accordance with the conventional method of mounting a milk receptacle beneath the body of a cow during milking, there is customarily provided a strap or belt made of a suitable flexible material such as leather, web fabric, or the like, extending across the cow's back, with the ends of the belt or strap hanging downwardly and attached to a transversely extending bar of metal or other rigid material beneath the cow's body and disposed slightly forwardly of the udder. A support frame is suspended from the transverse bar, a typical construction of the support frame including an arcuately shaped rod adapted to pivotally rest upon the bar and having a number of notches or recesses formed in the rod for engaging the bar, the support frame also including a straight beam fixed to the forward end of the arcuate rod and extending rearwardly generally longitudinally beneath the body of the cow. The conventional receptacle for receiving milk through flexible conduits from the individual teats of the udder is mounted near the outer or rear end of the beam.

During the milking operation the equipment thus slung beneath the cow tends to sway or oscillate incident to her movements, and it is desirable that the operator be able to so adjust the effective weight and oscillatory characteristics as to best suit an individual cow's particular physique and temperament.

By the construction of the present improvement there is provided a counterweighted support connected to the generally horizontal beam of the support frame above referred to. In its preferred form hereafter illustrated and described, the structure of the present invention includes a bracket having a pair of angularly related arms, the arms being preferably mutually perpendicular, and a weighted base member adjustably positionable longitudinally of one of the arms. The other of the two arms is connected to the beam of the support frame by means permitting longitudinal adjustment of the arm relative to the beam. The counterweight itself may be any desired shape, but a preferred form hereinafter shown and described includes a round, flat disc-like base and an upstanding central hub portion including selectively adjustable means for connecting the counterweight to the lower arm of the bracket. The relatively larger portion or base of the counterweight permits the device to be rested with stability upon the ground when not in use, and thereby to support the entire apparatus.

The construction of the present invention permits easy and rapid adjustment of the counterweight relative to the point of pivotal suspension in order to accommodate the entire apparatus slung beneath the cow to the individual physical variations of the cow. The adjustability of the apparatus further permits the operator to select for any given animal the exact arrangement of the equipment best suited to the particular animal's temperament.

Accordingly it is a principal object of the present invention to provide a novel and improved counterweighted construction for use in connection with a milk receptacle pivotally slung beneath a cow. Additional objects and purposes of the invention are to provide such a device including a counterweighted support to stabilize movement of the apparatus during milking; to provide such a device including a support bracket having a pair of angularly related arms, the arms being adjustably positionable relative to the pivotally slung apparatus and a counterweight respectively; and for other additional objects and purposes as will be understood from the study of the following description of a preferred embodiment of the invention taken in connection with the accompanying drawings, in which:

Fig. 1 is a side elevational view of a cow with the apparatus of the present invention mounted therebeneath.

Fig. 2 is a side elevational view, on an enlarged scale, of the apparatus seen generally in Fig. 1, including fragmentarily shown portions of the support strap, a flexible milk-supply conduit and the vacuum line extending from the receptacle.

Fig. 3 is a fragmentary sectional view taken on line III—III of Fig. 2.

Fig. 4 is a sectional view taken on line IV—IV of Fig. 2.

Fig. 5 is a side elevational view of the apparatus seen in Fig. 2, except that the apparatus is tilted somewhat by the adjustment of the components thereof in order to accommodate the apparatus differently to a cow being milked.

Fig. 6 is a sectional view taken on line VI—VI of Fig. 2.

Referring now in detail to the drawings, there is shown in Fig. 1 a cow having a belt or strap indicated generally at 10 draped across her back with the ends of the belt 12 and 14 (see Fig. 6) extending downwardly on either side. A horizontally disposed crossbar 16 is suspended beneath the cow and extends transversely thereof, the ends of the bar 16 being supported in openings formed in the lower ends 12 and 14 of the belt 10. Suitable retaining means 18 may be included on the outer end portions of the bar 16 in order to prevent the belt ends 12 and 14 from slipping off the bar. A support frame generally indicated at 20 is suspended from the bar 16, the support frame including an arcuate rod portion 22 and a straight beam 24. The inner concave surface 26 of rod 22 is provided with a number of spaced notches or recesses 28 into a selected one of which the horizontal bar 16 may be received, and frame 20 is thus effectively pivotally suspended from the bar for fore-and-aft swinging movement therebeneath.

A milk-receiving receptacle indicated generally at 30 is mounted at the outer end of the beam 24. The receptacle 30 includes a metallic base 32 having a downwardly extending threaded neck 34 which projects through an opening 35 formed in the beam 24 and is retained therein by means of a manually actuable wing nut 36. Above the base 32 there extends a cylindrical side wall 38 desirably made of a transparent material such as glass or suitable plastic, and metallic or other rigid cap 40 is mounted upon the upper part of the side wall 38, the cap being provided with four outwardly projecting nipples 42 each adapted to be connected by flexible conduit means to a teat cup 45. One such conduit means is fragmentarily seen in Fig. 2 and is indicated at 44. The component parts of receptacle 30 are retained in assembled relation as seen in Figs. 2 and 3 by a through-bolt 46 extending downwardly from the cap 40 through a bore 48 formed in the base and neck 32 and 34, the lower end of the bolt 46 being threadedly connected to a knurled nut 50. The bottom 32 of the receptacle 30 includes an outwardly projecting nipple 52 adapted to be connected preferably by flexible conduit means 54 to a vacuum source (not shown) whereby to remove milk continuously from the receptacle 30 during the milking operation as will be readily understood.

It will be seen that the apparatus thus far described, being effectively slung beneath the cow and supported on a swingable connection between the arcuate rod 22 and the bar 16, permits the apparatus to swing about more or less haphazardly during the milking operation incident to the movement of the cow's body. Such movement is effectively stabilized by the counterweighted support means connected to the frame 20 as will now be described. Such means include a bracket indicated generally at 60 and a counterweight base indicated generally at 70. The bracket 60 includes a pair of angularly related arms 62 and 64, the arms being in the present illustration shown as mutually perpendicular with the upper arm 62 extending in a generally vertical direction while the lower arm 64 extends in a general horizontal direction when the apparatus is in the position shown in Fig. 2. The upper arm 62 is connected to the beam 24 by means permitting longitudinal adjustment of the arm relative to the beam. As best appears in Fig. 4, a digitally operable wing nut or the like 66 threadedly engages with a portion of the beam 24 such as the depending side wall 68, the inner end 67 of the wing nut being frictionally abuttable against the side of arm 62 to retain the latter at a selected point.

The counterweight support base 70 may exemplarily include a lower enlarged portion 72 and an upwardly extending hub portion 74, desirably of metal or other heavy rigid material. Each of these may be circular in outline as herein shown, although it will be understood that other shapes and relationships may be used if desired. Means are provided for connecting the lower arm 64 of the bracket 60 to the counterweight 70 in selected positions longitudinally of the arm. In the present illustrative embodiment of the invention such means include a digitally operable wing nut or the like 76 threadedly engaging a transverse opening in the hub 74, the inner end 78 of the wing nut 76 being abuttable against the side of the arm 64, and thereby enabled to frictionally retain the arm 64 in a desired position relative to the counterweight 70.

It will be now seen that the apparatus in accordance with the present invention permits the milk-receiving receptacle 30 to be positioned in virtually any desired relationship relative to the udder of a cow during milking, and the tension imposed on the udder and teats may be controllably varied throughout a wide range. For example, as appears in Fig. 5, it may be desirable that the teat cup 45 exert a substantially greater downward pull upon the teat 80 and udder 82 during milking than in the case of the arrangement of Fig. 2. Hence, the parts may be arranged so that the horizontal crossbar 16 is engaged with a notch 28 on rod 22 relatively close to the juncture of the rod and the beam 24, and the position of the arms 62 and 64 of the bracket 60 may be also adjusted into the positions seen in Fig. 5 in order to provide the desired additional downward pull or tension upon the teat cup 45. Thus, the upper arm 62 of the bracket 60 is adjusted so that it projects higher above the beam 24, and the counterweight 70 may be moved outwardly along lower arm 64 of the bracket as appears in Fig. 5 so that the weight of the base member 70 is, to the desired extent, caused to contribute to the total downward tension upon the teat cup 45. It will be understood that the range of adjustability of the arms of bracket 60 permits the operator to select any desired position of counterweight 70 for a particular cow being milked, even including permitting counterweight 70 to rest partially or wholly on the ground or floor.

Accordingly, it will be seen that there is here provided an apparatus by which the operator may select the exact arrangement he desires for the relationship between the milk-receiving receptacle and the cow's udder during milking, including a selected adjustment of the degree of tension desired to be imposed upon the teat cups during the operation.

Modifications and changes from the specific forms of the invention hereinabove shown and described as illustrative are contemplated, and all such modifications and changes not departing from the spirit of the invention are intended to be embraced by the scope of the appended claims.

I claim:

1. A support for a receptacle for receiving milk through flexible conduits from teat cups, comprising: a belt for surrounding the body of a cow somewhat forward of the udder and a horizontal crossbar supported by ends of the belt and extending transversely beneath the body of the cow; a support frame including a generally horizontally disposed beam and an arcuate rod extending upwardly and rearwardly from the forward end of the beam, the inner surface of the rod having formed therein a plurality of transverse bar-receiving recesses whereby the rod is pivotally carried by the crossbar; a milk-receiving receptacle carried by the other end of the beam; and an adjustable counterweight assembly including a bracket having angularly related arms and a support base adjustably positionable along one of the arms, the other arm being longitudinally adjustably connected to the beam.

2. The invention as stated in claim 1 wherein said arms are approximately perpendicular and the arm connected to the beam extends downwardly therefrom.

3. In a milking machine, in combination: means including a transversely extending horizontal bar adapted to be carried by a cow and slung beneath the cow forwardly of the udder; a support frame including an arcuate rod member pivotally carried on the bar and extending forwardly and downwardly therefrom and a generally horizontal beam projecting rearwardly from the lower end of the rod; a milk-receiving receptacle carried on the rear portion of the beam; and weighted means beneath the beam and adjustably supported by the beam.

4. In combination with a milk-receiving receptacle support apparatus adapted to be slung beneath a cow forwardly of the udder and including a generally horizontally disposed beam supporting the receptacle, the provision of: a bracket having a pair of angularly related arms, the upper arm being connected to the support beam and extending downwardly therefrom and the lower arm extending generally horizontally; and a counterweight member connected to the lower arm.

5. The invention as stated in claim 4 wherein said bracket is L-shaped with said arms in substantially mutual perpendicular relation.

6. The invention as stated in claim 4 including means carried by the beam for clamping the upper arm at a selected point longitudinally thereof.

7. The invention as stated in claim 4 including means carried by the counterweight clamping the lower arm at a selected point longitudinally thereof.

References Cited in the file of this patent

UNITED STATES PATENTS

| | | |
|---|---|---|
| 2,460,856 | Stanke et al. | Feb. 8, 1949 |
| 2,497,299 | Daily | Feb. 14, 1950 |
| 2,543,162 | Flderke | Feb. 27, 1951 |
| 2,783,737 | Thomas | Mar. 5, 1957 |